(12) United States Patent
Simader et al.

(10) Patent No.: US 10,830,670 B2
(45) Date of Patent: Nov. 10, 2020

(54) SOFT COLLISION TARGET

(71) Applicant: Humanetics Austria GmbH, Linz (AT)

(72) Inventors: Julian Simader, St. Peter (AT);
Severin Wesenauer, Altmunster (AT);
Andreas Moser, Leonding (AT);
Hermann Steffan, Linz (AT)

(73) Assignee: Humanetics Austria GmbH, Linz (AT)

( * ) Notice: Subject to any disclaimer, the term of this patent is extended or adjusted under 35 U.S.C. 154(b) by 321 days.

(21) Appl. No.: 15/498,738

(22) Filed: Apr. 27, 2017

(65) Prior Publication Data
US 2017/0315022 A1 Nov. 2, 2017

(30) Foreign Application Priority Data

May 2, 2016 (DE) .......................... 10 2016 108 138

(51) Int. Cl.
| | |
|---|---|
| G01M 17/007 | (2006.01) |
| F21V 33/00 | (2006.01) |
| G01M 99/00 | (2011.01) |
| F21Y 115/10 | (2016.01) |
| F21W 131/00 | (2006.01) |

(52) U.S. Cl.
CPC ......... *G01M 17/0078* (2013.01); *F21V 33/00* (2013.01); *G01M 99/004* (2013.01); *F21W 2131/00* (2013.01); *F21Y 2115/10* (2016.08); *G01M 17/007* (2013.01)

(58) Field of Classification Search
CPC .. B60Q 1/00; F21Y 2115/10; G01M 17/0078; G01M 99/004; G01M 17/007; F21V 33/00; F21W 2131/00; F21S 4/22–26

USPC ........................................................ 73/865.3
See application file for complete search history.

(56) References Cited

U.S. PATENT DOCUMENTS

| | | | |
|---|---|---|---|
| 2001/0046140 A1* | 11/2001 | Chase ..................... | B60Q 1/00 362/549 |
| 2013/0249394 A1* | 9/2013 | Fay ...................... | B60Q 1/0088 315/77 |

(Continued)

FOREIGN PATENT DOCUMENTS

| | | |
|---|---|---|
| DE | 19853742 A1 | 5/2000 |
| DE | 102011085002 A1 | 4/2013 |
| DE | 202014102938 U1 | 9/2014 |

(Continued)

OTHER PUBLICATIONS

Steinmetz, High Precision Control of Active Safety Test Scenarios, Matteknik SP Rapport 2011 (Year: 2011).*

(Continued)

*Primary Examiner* — Eric S. McCall
*Assistant Examiner* — Timothy P Graves
(74) *Attorney, Agent, or Firm* — Howard & Howard Attorneys PLLC

(57) ABSTRACT

A soft collision target, in particular for use within the framework of non-destructive collision tests, has an illumination device that comprises at least one illuminant and a covering structure, wherein the covering structure surrounds the illuminant and is configured to absorb forces acting on the illumination device on a collision and/or to conduct them at least partly past the illuminant.

18 Claims, 1 Drawing Sheet

(56) References Cited

U.S. PATENT DOCUMENTS

2013/0278165 A1* 10/2013 Kikuchi ............. H05B 33/0815
　　　　　　　　　　　　　　　　　　　　　　　315/224
2017/0205057 A1* 7/2017 Winkler ................ F21V 21/005

FOREIGN PATENT DOCUMENTS

| DE | 102013113466 A1 | 6/2015 |
|---|---|---|
| WO | 2013/070153 A1 | 5/2013 |

OTHER PUBLICATIONS

Munoz, Blends of Polypropylene with Solid Silicone Additive, Wiley InterScience, 2006 (Year: 2006).*
Search Report of the German Patent and Trademark Office in related application DE 10 2016 108 138.8, dated May 22, 2017, 8 pages.

* cited by examiner

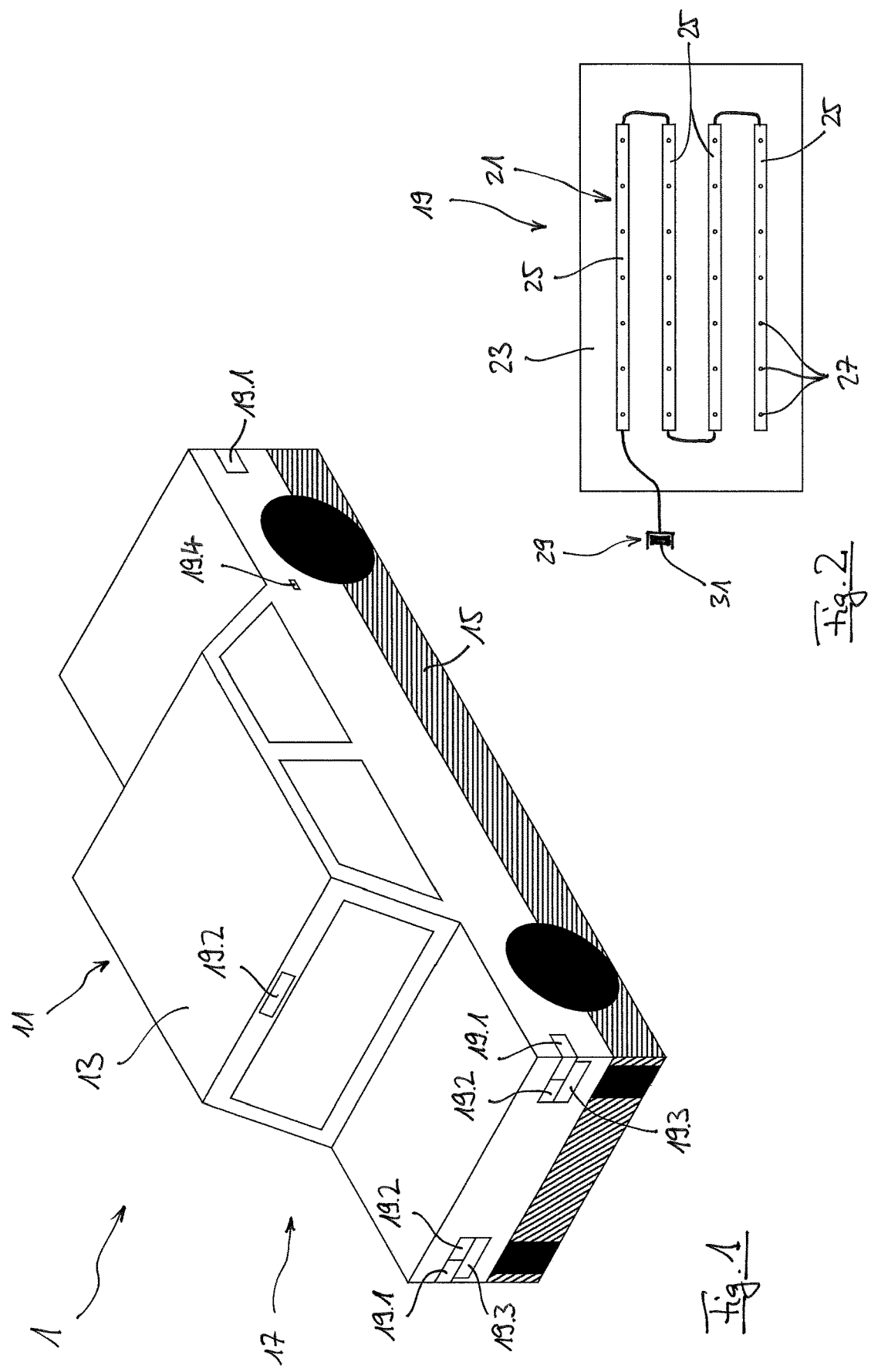

SOFT COLLISION TARGET

The present invention relates to a soft collision target, in particular for use within the framework of non-destructive collision tests.

It can, for example, be useful for the development and improvement of safety system within the framework of an approval procedure or also only for a comparison test to test the safety of a vehicle in that situations typical of an accident are simulated with the vehicle is then exposed to. Since an accident of a vehicle frequently involves a collision of the vehicle with at least one further object, such a collision is typically part of the test.

In so-called crash tests, the respective collision, and in particular its effects on the vehicle or on its occupants, is the focus of the investigation. Provision is therefore typically made in a crash test that at least the tested vehicle is exposed to a real collision and is consequently also damaged by the collision. The vehicle can as a rule subsequently not be used for a further crash test for this reason.

It is therefore generally advantageous if an accident or also simply an impending accident can be simulated in a non-destructive manner, i.e. in particular in a manner by which the respective vehicle is not damaged, is only negligibly damaged or is at least not damaged to the extent that it relates to the properties of the vehicle to be tested. The vehicle can namely then be used multiple times within the framework of such non-destructive collision tests. Non-destructive collision tests are therefore in particular advantageous when in a respective collision test, unlike in a crash test, it is not the collision itself or its effects that forms/form the focus, but rather, for example, properties and the behavior of the vehicle in the run-up to an impending collision.

Non-destructive collision tests are thus in particular suitable for testing advanced driver assistance systems (ADAS) that can, for instance, actually contribute to avoiding collisions or at least to reducing the effects of a collision in that they attenuate the power of a respective collision. Such advanced driver assistance systems can, for example, sense driving situations, e.g. by means of sensors and/or with reference to driving parameters of the respective vehicle, can determine them in the case of an impending collision and can, where necessary, intervene in the driving situation such that the collision is prevented or alleviated. Examples for such advanced driver assistance systems are, for instance, autonomous emergency braking systems and lane change assist systems.

The simulation of a situation typical for an accident in which a respective advanced driver assistance system should be triggered to be able to test its function and benefit, therefore as a rule also comprises the collision—that can frequently not be completely prevented—of the respective vehicle with a collision target. Since, however, it is not the collision effects that are tested in such a test, the collision itself does not have to be true to reality. Unlike in a crash test, a soft collision target can therefore be used as the collision target for the avoidance of damage to the tested vehicle instead of a real object corresponding to the simulated situation, in particular, for instance, instead of a further vehicle or similar.

Such a soft collision target is advantageously configured, unlike the object simulated by it, such that it is neither damaged nor does it itself damage the vehicle on a collision with the respective vehicle. For this purpose, the soft collision target is in particular configured as soft and elastically deformable and/or has a substantially lower weight than the object to be simulated. At the same time, however, the soft collision target preferably simulates the object at least to the extent that it is sensed by a respective advanced driver assistance system in a corresponding manner to the way the real object would also be sensed.

The soft collision target in particular corresponds to the object to be simulated or at least to a part of the object relevant to the collision test with respect to size and shape. For this purpose, the soft collision target can, for example, comprise a plastic cover that is supported by a flexible structure, e.g. a hose structure, that is in particular inflatable, or a foam frame. The plastic cover can in this respect in particular be printed with an image of the object to be simulated so that it is visually similar to the object.

The soft collision target can furthermore be suitably adapted with respect to its sensing by respective sensors. Different regions of the surface of the soft collision target can thus, for example, be specifically configured, e.g. correspondingly coated, for a reflection or absorption of radiation, e.g. radar, in order, for instance, to simulate reflective surfaces, e.g. metal surfaces, of the object to be simulated or to mask specific regions of the surface or of the inner space of the soft collision target.

It is typically required for a realistic simulation of a situation typical for an accident that the soft collision target moves like the respective object to be simulated, that is it can in particular travel like a vehicle. A drive of the soft collision target should, however, not be damaged by the collisions that occur and should in turn not result in damage to the tested vehicle. It is therefore advantageous to provide a drive of the soft collision target such that at least the drive is not involved in a collision that takes place.

Such a drive can, for example, be achieved in that it is provided in a flat dummy carrier by which the soft collision target is carried. The soft collision target in this respect in particular lies on the dummy carrier or is only loosely fastened to the dummy carrier, e.g. by means of a hook and loop connection or by a magnetic coupling, i.e. in particular in a manner releasable by forces typically occurring on a collision. A collision then advantageously only takes place between the respective vehicle to be tested and the soft collision target that can as a result, for example, consequently be released and hurled away from the dummy carrier. The dummy carrier, in contrast, is advantageously not impacted in this respect, but can rather in particular be driven over by the vehicle and/or can slide under the vehicle without thereby being damaged.

The simulation of the structure, of the shape, of the color and of the movement of a real object by means of a soft collision target may possibly not be sufficient depending on a respective advanced driver assistance system to be tested, in particular when the advanced driver assistance system is configured also to take account of an optical signal emission. The difficulties in simulating an optical signal emission at a soft collision target for non-destructive collision tests in this respect essentially result from the fact that the total soft collision target or at least all the elements of the soft collision target subjected to a respective collision have to be configured as sufficiently stable for a simple reusability of the soft collision target to survive a collision without damage.

It is an object of the invention to provide a soft collision target that can in particular be used multiple times in a particularly variable and adaptable manner for simulating a respective object, in particular also with respect to an optical signal emission of the object, as part of non-destructive collision tests.

The object is satisfied by a soft collision target having the features of claim 1 and in particular in that the soft collision target has an illumination device that comprises at least one illuminant and a covering structure, wherein the covering structure surrounds the illuminant and is configured to absorb forces acting on the illumination device on a collision and/or to at least partly conduct them past the illuminant.

In accordance with the invention, an illumination device is consequently provided as a component of the soft collision target. It is hereby made possible that the soft collision target can transmit optical signals for a still more comprehensive simulation of a real object such as a passenger vehicle, a truck or another single-track or multi-track vehicle or of a trailer of such a vehicle.

These signals can, for example be a flashing light to signal a change of lane or a turn or they can be a brake light to signal an active reduction in the travel speed. For this purpose, the illumination device can have a corresponding color and can be arranged in a corresponding location, in particular at an outer covering of the soft collision target. It can, however, occur in such a typical location that the illumination device is acted on directly in the event of a collision.

The specific configuration of the illumination device as an illuminant surrounded by at least one covering structure in particular serves to protect the illuminant from damage on such a collision, in particular by a mechanical shield. For this purpose, the covering structure can be configured such that it can absorb forces caused by the collision such that the forces reaching the illuminant can advantageously be reduced to at least a non-destructive degree. In addition or alternatively to this, the covering structure can be suitable, for example by a continuous extent leading correspondingly around the illuminant, to conduct at least some of the forces past the illuminant and in particular around the illuminant.

The ability of the covering structure to take up, in particular to absorb, forces can result, for example, from a deformability, preferably an at least also elastic deformability, of the covering structure. In this case, a collision can result in a deformation, in particular a compression, of the covering structure. It is thereby possible that at least a portion of the active impact forces is converted into potential energy or is preferably also dissipated such that it reaches the illuminant with a delay or not at all. In this manner, in particular maxima of the force effect can be attenuated such that the respective illuminant is at least so-to-say shielded from excessive force effects.

So that the covering structure can admittedly shield the illuminant in a mechanically protective manner, but optical signals generated by the illuminant can penetrate to the outside, the covering structure preferably has a light-permeable region at least in the direction of a desired signal transmission. It can, for example, be formed by a cut-out or by an aperture in the covering structure or also by a transparent section of the covering structure.

In accordance with a preferred embodiment, the illuminant is molded into the covering structure. An at least substantially complete surrounding of the illuminant is achieved in a comparatively simple manner by such a molding with a resulting at least substantially direction-independent shielding of the illuminant. An exception of a fully peripheral surrounding covered by this can in this respect be present in that feed lines, for instance cables or wires, can be provided for a contacting or for a power supply of the respective illuminant and can extend from the illuminant up to and outside the covering structure.

When the illuminant is molded into the covering structure, a material of the covering structure is preferably transparent so that an optical signal generated by the illuminant is not blocked by the covering structure. In this respect, the covering structure can also have a color in order thereby to fix or to modify the color of the optical signal. For example, the illuminant can be configured for the generation of white light, while the covering structure is transparent and has a red or yellow color such that the light is red or yellow respectively after passing through the covering structure.

The covering structure can furthermore be configured to disperse light transmitted from the illuminant in the manner of a diffusion film. An extended region of the illumination device can light up in this manner, preferably at least substantially homogeneously, even if the illuminant is essentially a point light source.

The illumination device is preferably at least substantially areal. In this respect, the illuminant itself does not equally have to be areal. It can rather be sufficient, for example, if the covering structure has an areal form overall. In particular a plurality of optionally different types of illuminant can then be arranged distributed within the covering structure to allow the covering structure to at least light up at an upper side of its flat form over its total areal extent.

Such an areal design, for example in the form of a sheet having a thickness of a few centimeters, in particular of at most approximately 2 cm, preferably of at most approximately 1 cm, enables a simple arrangement of the illumination device, in particular at an outer covering of the soft collision target since it can be fastened, for example, in an areally adhesive, sticking manner, by means of a hook and loop connection or by means of one or more magnets received, in particular molded, e.g. in the covering structure of the illumination device. In this respect, the peripheral contour of the illumination device is not restricted to a rectangular shape, but can rather generally have any desired shape.

It is furthermore preferred if the illumination device is flexible. In such an embodiment, the illumination device can e.g. also simply be arranged at a non-planar region of an outer covering of the soft collision target. It is hereby in particular made possible to provide an illumination device that extends around a corner of the soft collision target such that an optical signal can be transmitted over a larger directional range.

In addition, collision forces can be absorbed by the flexibility of the illumination device that can in particular be based on a flexibility of the covering structure of the illumination device and/or a breaking of the illumination device as a consequence of a collision can be prevented since the illumination device can advantageously simply be bent and can subsequently preferably again adopt a planar or other basic position.

In accordance with a preferred embodiment, a material of the covering structure comprises silicone. Such a material can be simply processed and provides advantageous properties, for example with respect to flexibility, mechanical stability, transparency and/or processability, in particular with respect to a molding of one more illuminants into the covering structure.

In accordance with an advantageous embodiment, the illuminant comprises at least one LED, in particular at least one LED of a red color, at least one LED of a yellow color and/or at least one LED of a white color. The use of an LED as the illuminant has the advantage of comparatively small power consumption and small heat generation. In addition, an LED is particularly suitable for an embedding into a flat covering structure and/or for a molding due to its compact design. The small size furthermore contributes to active forces being able to be easily conducted past the LED. An LED can furthermore be comparatively greatly mechanically loadable without losing its function.

The illuminant preferably comprises at least one LED strip. Such an LED strip is in particular formed by a flat, elongate carrier at which a plurality of LEDs are arranged distributed, preferably regularly, along its longitudinal extent, that are preferably coupled to one another such that they can be controlled together. The combination of a plurality of LEDs on one LED strip can thus simplify the production of the illumination device. The illumination device can in particular comprise a plurality of LED strips arranged, for example, in parallel and preferably equidistantly.

In accordance with an advantageous embodiment, the illumination device comprises at least one connector apparatus for a power supply and/or for a control of the illumination device, wherein the connection apparatus is configured to form a magnetic coupling with a complementary connector apparatus. The connector apparatus can have a magnet for this purpose. The complementary connector apparatus is in this respect actually complementary to the connector apparatus to the extent that it is configured correspondingly suitably for the magnetic coupling, that is, for example, that it comprises a magnet aligned with an opposite pole and/or has a matching surface shape. The complementary connector apparatus can, for example, be part of an energy source or of a control device for the soft collision target.

The magnetic coupling in particular serves to hold the connector apparatus of the illumination device and the connector apparatus complementary thereto mechanically at one another. The magnetic coupling has the advantage with respect to a purely mechanical coupling, for example by an insertion of a plug into a jack, that it can be releasable without damage on an exceeding of a threshold value of a force acting on the magnetic coupling, with the force threshold value being able to be comparatively small, but precisely defined, such that a reliable coupling takes place at a force below the threshold value.

A further advantage of a magnetic coupling can comprise a release of the connector apparatus from the complementary connector apparatus not being fixed—unlike on a coupling by a purely mechanical insertion, for instance—to a pulling in a specific direction. The magnetic coupling can rather, for example, also be released in that the connector apparatus is rotated or pivoted away with respect to the complementary connector apparatus. Such movements having a torque of the connector apparatus relative to the complementary connector apparatus would typically result, on a purely mechanical coupling, for instance on a coupling by insertion, in damage to at least one of the connector apparatus, which can be avoided by the magnetic coupling.

The connector apparatus of the illumination device configured to form a magnetic coupling in particular makes it possible to supply the illumination device with power via the connector apparatus from outside the illumination device and/or to control it without the risk of damage to the illumination device emanating therefrom in the event of a collision. For if the soft collision target is, for example, greatly deformed or is hurled away by a collision, this can result in tensions on lines connected to the illumination device and thus in loads on the connector apparatus oriented in different manners. In such a case, the magnetic coupling can be released simply and without damage to the involved connector apparatus or to the illumination device. The connector apparatus can equally simply subsequently be connected by a magnetic coupling again for a subsequent collision test.

In accordance with a preferred embodiment, the illumination device can be controlled for transmitting different illumination characteristics that in particular differ with respect to a pulse frequency, to a pulse break ratio, to a duration, to a color, to a brightness, to a spatial extent and/or to a spatial pattern. A respective illumination device can thus not only be binarily controlled to light or not to light, but different illumination characteristics can preferably be generated using the same illumination device, by which illumination characteristics optical signals of different content can thus be transmitted.

A respective illumination characteristic is in particular defined with respect to whether the illumination device lights up continuously or in a pulsed manner, which frequency the possible pulses have and how the duration of a pulse behaves with regard to the duration between two pulses. The total duration of the lighting up, by which the number of pulses can also be fixed, as well as the color and brightness of the transmitted light—which can comprise a color sequence or brightness sequence—can also define an illumination characteristic. In addition, the illumination device can be configured such that a variable surface lights up. Furthermore, the illumination device can be configured as a plurality of individual illumination devices arranged in a distributed manner that can each be formed as described above and that can, however, differ from one another. The illumination characteristic can in particular also be defined by the spatial extent or by the spatial pattern of the lighting up in such an arrangement of illumination devices.

The different illumination characteristics can in this respect in particular correspond to known and, optionally, standardized optical signals that can, for example, be sensed and evaluated by an advanced driver assistance system to be tested so that the advanced driver assistance system can, where necessary, react thereto in a suitable manner. Complex illumination characteristics can in this respect in particular be generated by a plurality of illumination deices connected to form a common illumination device.

It is furthermore preferred in this connection if the soft collision target simulates a vehicle and if the illumination device is arranged at the soft collision target for simulating a vehicle lighting, in particular an outside vehicle lighting, of the vehicle. In this respect, the illumination device can in particular be configured for simulating at least one brake light and/or at least one turn indicator. The vehicle is in particular a passenger vehicle, a truck or another single-track or multi-track vehicle or a trailer for such a vehicle. The illumination device can, for example, be provided at at least a rear side of the soft collision target and can simulate a typical arrangement of brake lights and/or turn indicators with respect to its spatial arrangement.

Not only the spatial arrangement, but in particular also the illumination behavior of the illumination device, in this respect preferably correspond to a real vehicle lighting for a realistic simulation of the vehicle lighting. In other words, the illumination device can be controlled, for example, to light up flashing in yellow at the left or at the right in the manner of turn indicators and/or—for warning—at both sides. Other parts of the illumination device can, for example, light up red in the manner of a brake light for the duration of an active reduction of the speed of the soft collision target.

In accordance with an advantageous embodiment, the illumination device is configured for a control of a serial bus system, in particular via a CAN bus, for instance in accordance with ISO 11898, and/or via a metal-oxide semiconductor field effect transistor (MOSFET), in particular via an n-conductive MOSFET. Such components are typically also used in real vehicles so that they can advantageously also be used in a simple manner in the soft collision target.

The initially named object is furthermore satisfied by an apparatus for carrying out collision tests, in particular non-destructive collision tests, that comprises a soft collision target having an illumination device, wherein the illumination device is in particular configured in accordance with any one of the above-described embodiments. The apparatus additionally preferably comprises a control device that is configured to control the illumination device for transmitting an illumination characteristic signaling a driving condition of the soft collision target or of a dummy carrier carrying the soft collision target.

It is thus possible by such an apparatus having a corresponding control device to transmit respective illumination characteristics specific to a driving condition. This enables a linking of the transmission of a respective illumination characteristic with the driving condition. In other words, a conclusion can be drawn from the illumination characteristics sensed, for example, by an advanced driver assistance system to be tested, on a driving condition of the soft collision target or of a dummy carrying the soft collision target. In this respect, the transmission of a respective illumination characteristic can generally take place independently of the actual driving condition of the soft collision target or of the dummy carrier, for instance only to so-to-say simulate a specific driving condition by a corresponding illumination characteristic.

The transmission of a respective illumination characteristic is, however, preferably dependent on the respectively present driving condition for a more realistic simulation of a driving situation. In a similar manner as with a real vehicle, a conclusion can thus be drawn from a transmitted respective illumination characteristic on the respectively present driving state of the soft collision target or of the dummy carrier. For this purpose, the control device can be configured to sense the driving condition of the soft collision target or of the dummy carrier and to control the illumination device for transmitting an illumination characteristic associated with the sensed driving condition to signal the driving condition. The sensing of the respective driving condition can in this respect take place in different manners.

In accordance with an advantageous further development, the control device is configured to associate a respective nominal driving condition with points of a predefined or predefinable travel trajectory of the soft collision target and to control the illumination device for transmitting an illumination characteristic associated with the respective nominal driving condition.

The trajectory, i.e. the extent of a respective road-test route, can be fixedly predefined for the soft collision target or for the dummy carrier or can in particular selectively be freely predefined—within the framework of the general movability of the soft collision target or of the dummy carrier and the performance of a drive apparatus generating the movement. The trajectory is preferably fixed before a respective collision test, with it at least partly also being able to depend on the occurrence of specific events or conditions during the course of the test. A remote control of the dummy carrier can furthermore generally also be considered so-to-say live during the carrying out of the collision test. A fixing of the trajectory in advance is, however, to be preferred as a rule with respect to defined and reproducible test conditions.

In the named embodiment, respective driving conditions of the soft collision target or of the dummy carrier can then be determined with reference to the predefined or predefinable trajectory in that a respective nominal driving condition is associated with points of the trajectory continuously or at discrete intervals. A change of direction can, for example, be determined from the trajectory and a turn condition can be associated with points of a region of the trajectory that comprises this change of direction, which turn condition can then result in the transmission of a flashing in the manner of a turn indicator. A braking condition that can result in an illumination characteristic corresponding to a lighting up of brake lights can be associated in a similar manner with an active reduction of the speed found at the trajectory.

Depending on the level of the braking, different braking conditions can be distinguished in this respect, e.g. normal braking or emergency braking, and can be signaled by different illumination characteristics in the manner of an adaptive brake light. If a heavy braking up to a complete or almost complete standstill is recognized with reference to the trajectory, a warning condition that can in particular be signaled by a flashing of yellow illumination devices at both sides can, for example, be associated with points of a region of the trajectory subsequent to the braking. A normal condition in which the illumination device does not light or only lights in accordance with a normal illumination characteristic that can e.g. correspond to parking lights or to a low beam of a vehicle can finally be associated with other regions of the trajectory.

Alternatively or additionally to a sensing of a respective driving condition by association of respective nominal driving conditions with a trajectory, provision can be made in accordance with a further embodiment that the control device is configured to derive a respective actual driving condition from received driving parameters of the soft collision target or of the dummy carrier ad to control the illumination device for transmitting an illumination characteristic associated with the respective actual driving condition.

The control device can, for example, receive the driving parameters, for example, from a drive apparatus of the soft collision target or of the dummy carrier and/or from one or more sensors for sensing specific driving parameters. A position, a speed, an acceleration, a direction, a change of direction and/or an orientation of the soft collision target can in particular be sensed by such sensors. An actual driving condition of the soft collision target or of the dummy carrier can then be derived using the received driving parameters. This actual driving condition can in this respect differ from a nominal driving condition, for instance when the predefined or predefinable trajectory is not exactly tracked due to tolerances or due to an error.

An illumination characteristic that the illumination device can be controlled by the control device to transmit can be associated in a similar manner as with the respective nominal driving condition with a respective actual driving condition. In this respect, the examples named for the nominal driving conditions can be correspondingly transferred to the actual driving conditions.

A respective illumination device that can also be formed as an arrangement of a plurality of individual illumination devices of the described kind can thus advantageously be controlled for transmitting illumination characteristics that correspond to a driving path of the soft collision target.

Which illumination characteristic is associated with which driving condition can be predefined or predefinable and can preferably be defined on a software basis. It can, however, generally also be possible to control the illumination device or the illumination devices completely freely, in particular again on a software base, for transmitting different possible illumination characteristics. The fixing of illumination characteristics to be respectively transmitted preferably takes place via the same software or via the same input apparatus with which the fixing of the trajectory of the soft collision target or of the dummy carrier also takes place.

In accordance with a further embodiment, the apparatus comprises a drivable dummy carrier to which the soft collision target is fastened, with the control device being at least partly provided at the dummy carrier. The dummy carrier can in this respect in particular be robust and be configured such that it can be driven over without being damaged. For this purpose the dummy carrier is in particular flat and is configured for arranging the soft collision target at its upper side. Since the control device is at least partly provided at the dummy carrier, in particular within the dummy carrier, at least the part of the control device provided at the dummy carrier can be protected from damage by a collision. To control the illumination device, the control device can in particular be connected to it via the named connector apparatus.

The invention will be described in more detail in the following only by way of example with reference to the drawings.

FIG. 1 shows an embodiment of a soft collision target in a schematic perspective representation; and FIG. 2 shows an illumination device of a soft collision target in a schematic representation.

An apparatus 1 for carrying out non-destructive collision tests is shown in FIG. 1 that comprises a soft collision target 11 as well as an illumination device 17.

The soft collision target 11 simulates a vehicle, in the example shown a passenger car. For this purpose, the soft collision target 11 has an outer cover 13 of plastic that is carried at the inner side by a soft frame that comprises an inflatable hose structure. The soft collision target 11 is thereby deformable, in particular elastically deformable.

The soft collision target 13 corresponds at least roughly to the passenger car to be simulated with respect to its shape and dimensions. In addition, the outer covering 13 that substantially bounds the soft collision target 13 at all sides, with the exception of the lower side, is printed such that finer structures of the vehicle are also simulated and the soft collision target 11 also corresponds to the passenger car in color.

To be sensed, in particular by means of radar, for example, by sensors of an advanced driver assistance system of a vehicle such as a real passenger car, the outer covering 13 is configured to reflect a corresponding radiation, in particular radar, at least in those regions in which a passenger car would also reflect the radiation. A lower region of the outer covering 13 that corresponds to a free space beneath the simulated passenger car is configured as an absorption region 15 shown striped to absorb radiation in order, on the one hand, to be sensed as a free space by sensors and, on the other hand, to shield the interior of the soft collision target 11, in particular a dummy carrier (not recognizable) that moves and carries the soft collision target 11, from a sensing by respective sensors.

The soft collision target 11 can move or can be moved over an underfloor in accordance with a predefined or predefinable trajectory by means of a dummy carrier that comprises a drive unit. To be able to be driven over by a vehicle colliding with the soft collision target 11 without damaging the vehicle or the dummy carrier, the dummy carrier is flat and is correspondingly robust. To be carried by the dummy carrier, the soft collision target 11 can be placed onto an upper side of the dummy carrier and can be fastened, in particular releasably fastened, thereto. The dummy carrier is in this respect in particular configured to move the soft collision target 11 in a manner corresponding to the travel of a real vehicle, for example with respect to speed and dynamics.

For an even more realistic simulation of a real vehicle, the soft collision target 11 has the illumination device 17 that is configured as an arrangement of individual illumination devices 19. Each of the illumination devices 19 comprises an illuminant 21 as well as a covering structure 23 that surrounds the illuminant 21.

The illuminant 21 in the example shown is represented by LED strips 25 that are of strip shape and that each comprise a plurality of LEDs 27 arranged distributed over the longitudinal extent of an LED strip 25 (cf. FIG. 2). The LED strips 25 are connected to one another via corresponding lines such that the LEDs 27 of a respective illumination device 19 can be controlled together. In the example shown, the connection of the LED strips 25 takes place in a serial manner, but can also take place at least in part in parallel. In general, a respective illumination device 19 can have even further illuminants 21, optionally of a different kind.

The covering structure 23 surrounding the illuminant 21 is configured to absorb the forces acting on the respective illumination device 19 on a collision and to conduct them at least partly past the illuminant 21. For this purpose, the LED strips 25 are molded into the covering structure 23 that comprises silicone as the material such that a respective illumination device 19 has a rectangular, sheet-like shape of small thickness of approximately 1 cm within which the LED strips 25 are arranged in parallel with and equidistant from one another.

The covering structure 23 is at least substantially transparent at at least one side facing away from the outer cover 13 of the soft collision target 11 such that light generated by the LEDs 27 of the LED strips 25 can pass through the covering structure 23 and can be perceived from the outside. In this respect, the covering structure 23 is configured in the manner of a diffusion film to disperse the light passing through such that a single illumination device 19 appears at least substantially as an areal light source. The individual LEDs 27 can in this respect, however, generally still be recognizable. In addition, the covering structure 23 has a respective color such that the initially white light generated by the LEDs has this color after passing through a transparent region of the covering structure 23.

The illumination devices 19 are fastened to the outer covering 13 of the soft collision target 11 by adhesive bonding, by means of a hook and loop connection or by a magnetic coupling at points that are typical for elements of an outer vehicle illumination. In this respect, the illumination devices 19 can be arranged as at least substantially flat. The illumination devices 19 are, however, in turn likewise flexible due to the flexibility of the LED strips 25 and of the silicone covering structure 23 such that they can also be attached in uneven regions of the outer covering 13 since they can adapt to the unevenness of the outer covering 13. An example for this is represented by the illumination devices 19.1 that are attached to corners of the outer covering 13 and that are fastened to the outer covering 13 kinked or bent at an angle of approximately 90°.

The power supply and the control of the illumination devices 19 respectively takes place via a connector apparatus 29 that is only shown purely schematically in FIG. 2 and that is configured for a magnetic coupling with a complementary connector apparatus. For this purpose, the connector apparatus 29 is configured in the form of a magnetic plug and comprises a magnet 31 that serves, in cooperation with a corresponding magnet of the complementary connector apparatus, to hold the connector apparatus 29 and the complementary connector apparatus to one another such that an electrical connection of the two connector apparatus hereby also takes place. At the same time, the magnetic coupling is easily removable on a non-specific force effect that can in particular also include torques without the connector apparatus being damaged is so doing.

For the control and for the power supply of the total illumination device 17—that is formed as an arrangement of individual illumination devices 19—the apparatus 1 furthermore comprises a control device that is arranged beneath the soft collision target in the dummy carrier and is therefore not recognizable in the Figures. The control device is in this respect connected to the illumination devices 19 via the respective connector apparatus 29. It is generally also conceivable that the individual illumination devices 19 are first connected to one another and that the arrangement 17 of the individual illumination devices 19 has a connector apparatus 29 that is common to all the individual illumination devices 19 and is configured to form a magnetic coupling. In this case, the control device can then be connected via this common connector apparatus 29 to the illumination device 17 and thus ultimately also to the individual illumination devices 19.

In the case of a collision of a vehicle with the soft collision target 11, the soft collision target 11 can be deformed, in particular crumpled or compressed in another manner. In addition the collision can have the result that the soft collision target is hurled away and in so doing is in particular released from the dummy carrier that carries it and that can be driven over by the vehicle. The fact that the illumination device 17 or the individual illumination devices 19 is/are not damaged as a rule in this process is in particular due to the facts that the covering structure 23 protects the individual illuminants 21, that the individual illumination devices 19 are flexible and are thus in turn configured as deformable, and that the connection of the illumination devices 19 to the control device in the dummy carrier is releasable without damage due to the magnetic coupling in a similarly simple manner as the fastening of the soft collision target 11 to the dummy carrier. The soft collision target 11 can thus again be fastened to the dummy carrier after a collision and the illumination device 17 can again be connected to the control device via the magnetic coupling such that a further collision test can subsequently be carried out.

During the travel of the soft collision target 11, the illumination device 17 is controlled by the control device to transmit illumination characteristics that signal a respective driving condition of the soft collision target 11 or of the dummy carrier traveling it. To this extent, the transmitted optical signals correspond to a travel path of the soft collision target 11. In this respect, turn indicators are simulated by yellow illuminated illumination devices 19.1 in corners of the soft collision target 11 as well as by equally yellow illuminated lateral illumination device 19.4, while brake devices are simulated by three red illumination devices 19.2 at the rear tail lights are simulated by two further red illumination devices 19.3 at the rear.

Illumination characteristics of real vehicles can thus be simulated particularly realistically by such an arrangement 17 of illumination devices 19. In this respect, complex illumination characteristics, e.g. in the manner of a so-called adaptive brake light, can in particular be simulated that can serve, for instance for a warning of following traffic in the event of heavy breaking, optionally up to the standstill of the vehicle, for example by a brighter lighting up of the brake lights 19.2, additional flashing of the brake lights 19.2, additional or additionally brighter lighting up of the tail lights 19.3 and/or additional or subsequent flashing at both sides of the turn indicators 19.1, 19.4.

The provision of one or more illumination devices surviving a collision without damage at a soft collision target can in particular thus contribute to a more realistic simulation of situations typical of an accident within the framework of non-destructive collision tests.

REFERENCE NUMERAL LIST

1 apparatus for carrying out collision tests
11 soft collision target
13 outer covering
15 absorption region
17 arrangement of illumination devices
19 illumination device
21 illuminant
23 covering structure
25 LED strip
27 LED
29 connector apparatus
31 magnet

The invention claimed is:

1. A soft collision target non-destructive collision tests, the soft collision target including:
   a frame having a predefined shape;
   an outer cover disposed around the frame with the outer cover having at least one radar reflective area and radar absorbing area;
   an illumination device connected to the outer cover with the illumination device comprising:
   at least one illuminant; and
   a covering structure surrounding the illuminant to absorb forces acting on the illumination device during a collision by conducting the forces at least partly past the illuminant;
   wherein the covering structure and the illuminant are elastically deformable as a unit between a planar position prior to the collision, and a bent position during the collision of the destructive collision test;
   wherein the illumination device comprises at least one releasable connector for a power supply and a control device with the connector disconnecting and unhooking the illumination device from the power supply and control device during the collision when the illumination device is in the bent position.

2. The soft collision target in accordance with claim 1, wherein the illumination device is at least areal.

3. The soft collision target in accordance with claim 1, wherein the illumination device returns to the planar position after being in the bent position.

4. The soft collision target in accordance with claim 1, wherein a material of the covering structure comprises silicone.

5. The soft collision target in accordance with claim 1, wherein the illuminant comprises at least one light emitting diode (LED).

6. The soft collision target in accordance with claim 5, wherein the illuminant comprises at least one LED of a red color, at least one LED of a yellow color and/or at least one LED of a white color.

7. The soft collision target in accordance with claim 1, wherein the releasable connector is a magnetic coupling with a complementary connector apparatus.

8. The soft collision target in accordance with claim 1, wherein the illumination device can be controlled to transmit different illumination characteristics.

9. The soft collision target in accordance with claim 8, wherein the different illumination characteristics are selected from the group of members of a differing pulse frequency, a differing pulse break ratio, a differing duration, a differing color, a differing brightness, a differing spatial extent, a differing spatial pattern and combinations thereof.

10. The soft collision target in accordance with claim 1, wherein the frame and outer cover simulates a vehicle and the illumination device is arranged on the outer cover to simulate a vehicle illumination of the vehicle.

11. The soft collision target in accordance with claim 10, wherein the vehicle illumination is at least one of a brake light and at least one turn indicator.

12. The soft collision target in accordance with claim 1, wherein the illumination device is controlled through at least one of a serial bus system in accordance with ISO 11898 and a metal-oxide semiconductor field effect transistor.

13. The soft collision target in accordance with claim 1, wherein the illumination device is removeably connected with the soft collision target.

14. The soft collision target in accordance with claim 1, wherein the illumination device, as a unit, can be about 90 degrees relative to the planar position prior to the collision.

15. An apparatus for carrying out non-destructive collision tests, the apparatus comprising:
    a soft collision target including:
        a frame having a predefined shape;
        an outer cover disposed around the frame with the outer cover having at least one radar reflective area and radar absorbing area; and
        an illumination device connected with the outer cover;
    a control device controlling the illumination device by transmitting an illumination characteristic to signal a driving condition of the soft collision target;
    wherein the illumination device comprises at least one illuminant and a covering structure, the covering structure and the illuminate being flexible with the illuminant molded into the covering structure and the covering structure surrounding the illuminant to absorb forces acting on the illumination device during a collision by conducting the forces at least partly past the illuminant;
    wherein the illumination device, as a unit, is elastically deformable to move from a planar position prior to the collision to a bent position during the collision of the destructive collision test to absorb forces during the collision; and
    wherein the illumination device comprises at least one releasable connector for a power supply and a control device with the connector disconnecting and unhooking the illumination device from the power supply and control device during the collision when the illumination device is in the bent position.

16. The apparatus in accordance with claim 15, wherein the control device is-associates a respective nominal driving condition with points of a predefined travel trajectory of the soft collision target and controls the illumination device to transmit an illumination characteristic associated with the respective nominal driving condition.

17. The apparatus in accordance with claim 15, wherein the control device derives a respective driving condition from received travel parameters of the soft collision target and controls the illumination device to transmit an illumination characteristic associated with the respective actual travel condition.

18. The apparatus in accordance with claim 15, wherein the illumination device, as a unit, can be about 90 degrees relative to the planar position prior to the collision.

* * * * *

UNITED STATES PATENT AND TRADEMARK OFFICE
CERTIFICATE OF CORRECTION

PATENT NO. : 10,830,670 B2
APPLICATION NO. : 15/498738
DATED : November 10, 2020
INVENTOR(S) : Julian Simader et al.

Page 1 of 1

It is certified that error appears in the above-identified patent and that said Letters Patent is hereby corrected as shown below:

In the Claims

Column 12, Line 34 (in Claim 1): please replace "A soft collision target non-destructive" with --A soft collision target for non-destructive--

Column 14, Line 25 (in Claim 16): please replace "the control device is-associates a respective" with --the control device associates a respective--

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*